Figure 1:
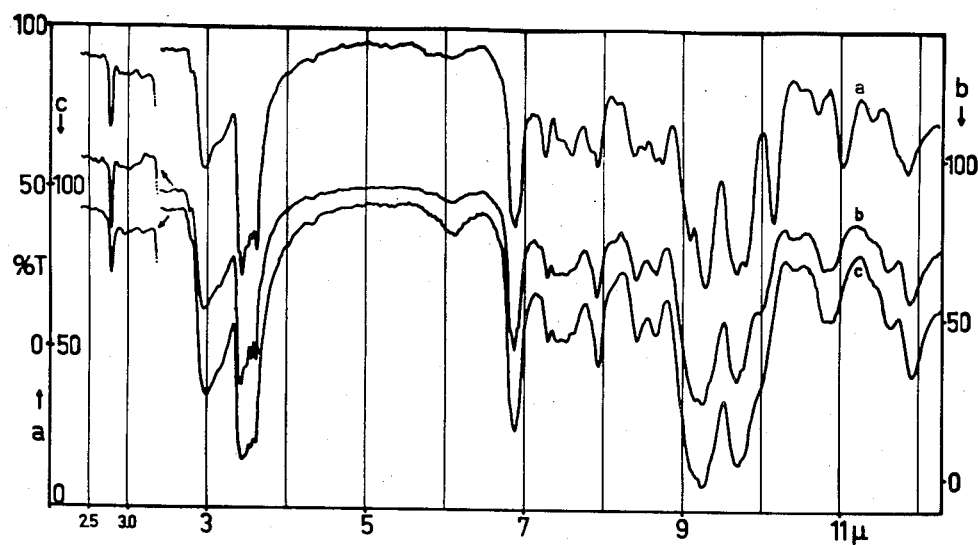

June 26, 1962

C. H. EUGSTER ETAL 3,041,355
PRODUCTS RELATED TO MUSCARINE AND THE
PREPARATION OF SUCH PRODUCTS

Filed May 1, 1958

2 Sheets-Sheet 1

Conrad Hans EUGSTER
Rolf DENSS
Franz HAFLIGER
Emil GIROD
INVENTORS

By:

Wenderoth, Lind & Ponack
Attorneys

United States Patent Office 3,041,355
Patented June 26, 1962

3,041,355
PRODUCTS RELATED TO MUSCARINE AND THE PREPARATION OF SUCH PRODUCTS
Conrad Hans Eugster, Wallisellen, and Rolf Denss, Franz Hafliger, and Emil Girod, Basel, Switzerland, assignors to Geigy Chemical Corporation, New York, N.Y., a corporation of Delaware
Filed May 1, 1958, Ser. No. 732,327
Claims priority, application Switzerland May 4, 1957
9 Claims. (Cl. 260—347.7)

The present invention concerns amines of the tetrahydrofurane series which correspond to the general formula:

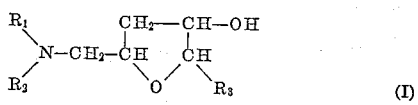

wherein:
$R_1$ and $R_2$ represent low molecular alkyl radicals which can also be bound to each other,
$R_3$ represents an alkyl or cycloalkyl radical or an aryl or aralkyl radical possibly substituted by low molecular alkyl or alkoxy groups or by halogen atoms.

It also concerns a process for the production of these amines, the intermediate products formed in this process and also the quaternary ammonium compounds derived from amines of the general Formula I and the production thereof.

It has been found that starting from the easily accessible 2-substituted 5-formyl-furane-3-carboxylic acid alkyl esters, the tetrahydrofurane derivatives defined above can be obtained by reacting in formic acid according to Leuckart such starting materials of the general formula:

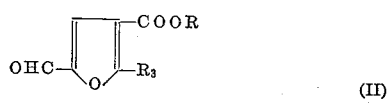

with low molecular dialkyl formamides of the general formula:

wherein R represents a low molecular alkyl radical and $R_1$, $R_2$ and $R_3$ have the meanings given above, to form 2-substituted 5-dialkylaminomethyl-furane-3-carboxylic acid alkyl esters, converting these latter compounds by reacting first with hydrazine and then with nitrous acid into the corresponding acid azides and then heating these direct or after converting them into 2-substituted 5-dialkylaminomethyl-furyl-3-carbamic acid esters or 2-substituted 3-acylamino- or 3-isocyano-5-dialkylaminomethyl furanes, which conversion can be done by treating with suitable hydroxyl compounds or carboxylic acids or by heating in inert organic solvents, with an aqueous mineral acid, and reducing the resultant 2-substituted 3-oxo-5-dialkylaminomethyl-2.3-dihydrofuranes of the general formula

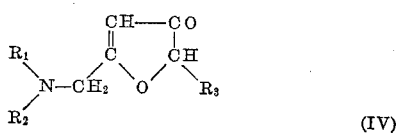

wherein $R_1$, $R_2$ and $R_3$ have the meanings given above, or the tautomeric 2-substituted 3-hydroxy-5-dialkylaminomethyl-furanes or mixtures thereof by treating with an alkali metal borhydride, if desired in the presence of a water soluble tertiary amine, to form the corresponding 2-substituted 3-hydroxy-5-dialkylaminomethyl-tetrahydrofuranes of the general Formula I, if desired converting these into salts with inorganic or organic acids or, if necessary, after previous distillation in the vacuum, separating into fractions of enriched or pure stereoisomers by adsorption chromatography.

The starting materials of the general Formula II can be produced by condensation of sugars, for example glucose or mannose, with β-keto acid esters (acylacetic acid esters) to form 2-substituted 5-polyhydroxyalkyl-furane-3-carboxylic acid esters (see West, J. Biol. Chem., 74, 561 (1927); Gonzalez, Anales soc. espan. fis. quim., 32, 815 (1934); Müller and Varga, Berichte der deutschen chemischen Gesellschaft, 72, 1993 (1939)), and break-down of the polyhydroxyalkyl group with oxidising agents which split glycol such as periodic acid or lead tetra-acetate to form the formyl group (see Müller and Varga, Berichte, 72, 1995 (1939); Jones, J. Chem. Soc. 1945, 116). Examples of starting materials of the general Formula II are 2-methyl-, 2-ethyl-, 2-n-propyl-, 2-isopropyl-, 2-n-butyl-, 2-isobutyl-, 2-tertiary butyl-, 2-cyclopropyl-, 2-cyclohexyl-, 2-phenyl-, 2-p-tolyl-, 2-o-anisyl-, 2-p-anisyl-, 2-(m.p-dimethoxy-phenyl)-, 2-(o-chlorophenyl)-, 2-(p-chlorophenyl)-, 2-(p-bromophenyl)-, 2-benzyl-, 2-(o-methoxy-benzyl)-, 2-(p-chlorobenzyl)-, 2-(β-phenyl-ethyl)- and 2-(γ-phenyl-propyl)-, 5-formyl-furane-3-carboxylic acid ethyl esters and methyl esters. These compounds can be reacted for example with dimethyl formamide, diethyl formamide, di-n-propyl formamide, di-n-butyl formamide, N-formyl-pyrrolidine or N-formyl-piperidine.

Another process for the production of 2-substituted 5-dialkylaminomethyl-3-carboxylic acid esters is the reaction of starting materials of the general Formula II with low molecular dialkylamines in the presence of catalytically activated hydrogen.

The acid azides are obtained by the consecutive reaction of hydrazine and then nitrous acid with the 2-substituted 5-dialkylaminomethyl-furane-3-carboxylic acid esters. These acid azides can then be converted, for example by treating with benzyl alcohol or with anhydrous low molecular alkanols, into 2-substituted 3-carbobenzyloxyamino- or 3-carbalkoxyamino-5-dialkylaminomethyl-furanes, i.e. into 2-substituted 5-dialkylaminomethyl-furyl-(3)-carbamic acid benzyl esters or alkyl esters, whilst on treating with organic acids, for example with anhydrous formic acid, acylamino compounds such as the 2-substituted 3-formylamino-5-dialkylaminomethyl-furanes are obtained. Also 2-substituted 3-isocyano-5-dialkylaminomethyl-furanes for example, are obtained by heating the corresponding acid azides with inert anhydrous organic solvents such as, e.g. benzene, dibenzyl ether or diamyl ether.

It is known from the literature that on heating 3-amino-furanes with alkalies or acids, the amino group is easily split off as ammonia. Stevenson and Johnson, J. Am. Chem. Soc., 59, 2525, (1937), have determined that on alkaline hydrolysis, the furane nucleus is decomposed into small portions but the reaction products of acid hydrolysis have not yet been more closely investigated. It could not have been foreseen therefore, that modification products of the azides of 2-substituted 5-dialkylaminomethyl-furane-3-carboxylic acids of the type defined above as well as the azides themselves could be hydrolysed with relatively good yields to the 2-substituted 3-oxo-5-dialkylaminomethyl-2.3-dihydrofuranes or to the tautomeric 2-substituted 3-hydroxy-5-dialkylaminomethyl-furanes or mixtures thereof by heating with aqueous mineral acids such as, for example 2 N-hydrochloric acid.

For example sodium borhydride or potassium borhydride, e.g. in methanol, water or mixtures thereof are suitable for the reduction of the unsaturated basic keto compounds to the saturated basic hydroxyl compounds. In addition to the one already in the molecule two further asymmetric centres are formed in the reduction; thus in all there can be four racemic stereoisomeric pairs. In this connection it was surprisingly found that the ratio to each other of these pairs of stereoisomers could be influenced by the addition of water soluble tertiary amines such as, e.g. trimethylamine or, in particular, triethylamine.

If a 2-methyl-5-formyl-tetrahydrofurane-3-carboxylic acid alkyl ester and dimethyl formamide are used as starting materials for the whole sequence of reactions corresponding to the general Formulae II and III, mixtures of stereoisomeric 2-methyl-3-hydroxy-5-dimethylaminomethyl-tetrahydrofuranes are obtained as reduction products which contain normuscarine, the fundamental tertiary base of the natural muscarine. In normuscarine the hydroxyl group is in the trans-position to the methyl group and dimethylaminomethyl group corresponding to the steric formula

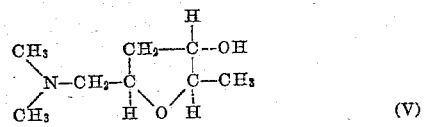
(V)

Other stereoisomers are the epi-normuscarine, all three ring substituents of which are in the cis-position corresponding to Formula VI, the allo-normuscarine, the methyl group of which is in the trans-position to the hydroxyl group and to the dimethylaminomethyl group corresponding to Formula VII, and epiallo-normuscarine having the dimethylaminomethyl group in the trans-position to the methyl group and to the hydroxyl group corresponding to the Formula VIII (VI)
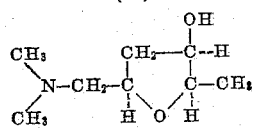

(VII)
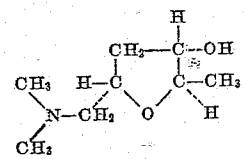

(VIII)
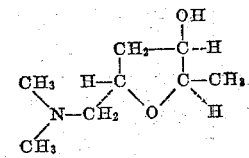

Hydrochloric acid, hydrobromic acid, sulphuric acid, phosphoric acid, acetic acid, tartaric acid, citric acid and ethane disulphonic acid are used for example to form salts with the tertiary bases obtained in the reduction.

It could not have been foreseen that stereoisomeric mixtures of tertiary bases of the general Formula I could be separated successfully by adsorption chromatography into sterically uniform substances. As the separation of these oily mixtures gives surprisingly better results than, for example, the separation of the crystallising quaternary salts mentioned below, for example by fractionated crystallisation or partition chromatography, this method of separating the stereoisomeric tertiary bases is of essential importance not only for obtaining these compounds in a sterically uniform form but also for finally obtaining sterically uniform quaternary bases or salts having high biological activity. Further particulars of such bases or salts will be given below.

In the case of 2-methyl-3-hydroxy-5-dimethylaminomethyl-tetrahydrofurane, the separation can be performed for example by adsorbing steroisomeric mixtures of these compounds on an aluminium oxide column from a non-polar or weakly polar solvent, and eluting in fractions with a similar solvent to which are added if desired, gradually increasing, but relatively small amounts of a low molecular weight alkanol. Benzene or ether are preferably used as the non-polar or weakly polar solvents respectively. The addition of low molecular alkanols is concerned in particular with the use of highly active aluminium oxide, methanol, for example in stepped additions of 0.2; 0.4; 0.6% etc. being particularly suitable. However, also aluminium oxide of slightly less activity can be used equally well and the fractions can be eluted with for example benzene, possibly also with a mixture of benzene/ether and finally with ether.

Rac. epi-normuscarine, rac. allo-normuscarine, rac. normuscarine and finally rac. epiallo-normuscarine are successively eluted as pairs of stereoisomers. The two first named pairs of stereoisomers can also be easily further separated from the two latter pairs by fractional distillation in high vacuum, since their boiling points at high vacuum lie about 20° lower. In particular, when obtaining normuscarine is the predominant or exclusive interest, the requirements of aluminium oxide and solvents can be substantially reduced, by using for the chromatographic separation only one or several fractions from a high vacuum distillation of an original mixture of stereoisomers.

Figure 2:
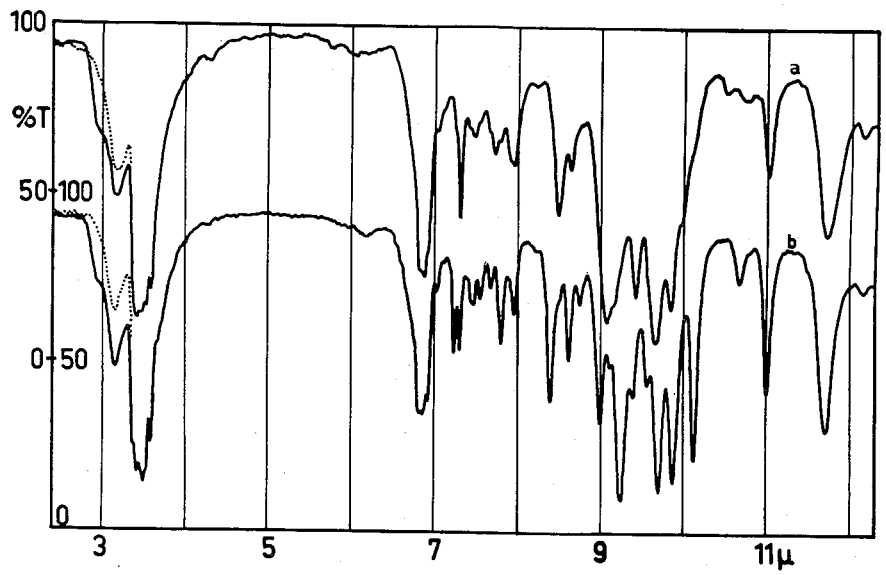

To identify the racemic stereoisomers in the various fractions of the chromatograms, infra-red spectra of all or of selected fractions are advantageously recorded and compared with those of the pure stereoisomers. In FIG. 1 of the accompanying drawings, the infra-red spectra are given of (a) rac. epiallo-normuscarine, (b) normuscarine from natural muscarine and (c) racemic normuscarine (containing some water). FIG. 2 shows the infra-red spectra of (a) rac. allo-normuscarine and (b) rac. epi-normuscarine (solutions in CCl₄ about 5%, thickness of layer 0.1 mm. The range of OH-valency oscillation at about 50-fold dilution, thickness of layer 5 mm. is in each case plotted separately on the left). The four racemates used were isolated according to Example 5 below.

Whilst the dextro-rotatory normuscarine of H. C. Eugster is obtained by thermic decomposition of the chloride of natural muscarine base (Helv. Chim. Acta 39, 1031 (1956), see Experentia 10, 299 (1954)) and its constitution can be found from the constitution given by F. Kögl, C. A. Salemink, H. Schouten and F. Jellinek (Rec. Trav. chim. Pays-Bas, 76, 109 (1957)) of muscarine, the racemate of normuscarine and the salts of the racemic muscarine base obtained therefrom in pure or enriched form by quaternisation with reactive esters of methanol, has not been previously described. This is also true of the three pure or enriched racemic stereoisomers of normuscarine, epi-normuscarine, allo-normuscarine and epiallo-normuscarine and the salts of the racemic epi-muscarine, allo-muscarine and epiallo-muscarine obtained therefrom. Also, with regard to their steric composition, the reduction products obtained direct in the reduction according to the present invention which are distinguished by a considerable content of racemic normuscarine, are new mixtures. Homologues of normuscarine and the quaternary muscarine base, both with regard to the substitutent in the 5-position as well as with regard to the substituents of the amino or ammonium group, as well as stereoisomers thereof, i.e. compounds of the general Formula I in which $R_1$, $R_2$ and $R_3$ have the meanings given above but at least one of these symbols does not represent a methyl group, have not been known up to now either as sterically uniform optically active or racemic substances or as stereoisomeric mixtures.

The present invention also concerns, as further step in the process to be performed if desired, the reaction of directly obtained reaction products, the reaction of parts of the reduction products enriched with racemic stereoisomers, or the reaction of considerably pure racemic stereoisomers, i. e. pure racemic normuscarine and its pure racemic stereoisomers or sterically uniform racemic homologues, all of which correspond to the general Formula I, with reactive esters, in particular halides, sulphates or aryl sulphonic acid esters of aliphatic or araliphatic alcohols of the general formula

$$R_4\text{—OH} \qquad\qquad\qquad (IX)$$

wherein $R_4$ represents an alkyl or alkenyl radical or an aralkyl radical possibly substituted by low molecular alkyl or alkoxy groups or by halogen atoms, as well as, if desired, the subsequent replacement of the anion originating from the reactive ester by another anion. The quaternary ammonium compounds so obtained are salts of bases of the general formula

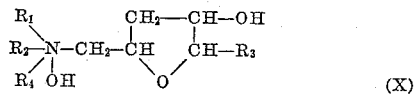

wherein $R_1$, $R_2$, $R_3$ and $R_4$ have the meanings given above.

Suitable quaternising agents are, for example, methyl iodide, methyl bromide, methyl chloride, ethyl bromide and iodide, n-propyl bromide and n-butyl bromide, allyl bromide and iodide, p-toluene sulphonic acid methyl ester, dimethyl sulphate and diethyl sulphate, benzyl chloride and bromide, as well as p-chloro-, p-methyl- and p-methoxy benzyl bromide in the presence or absence of inert organic solvents such as, e. g. acetone or ethyl acetate. If desired, the quaternary salts first obtained can then be converted in a known manner into salts of other acids, for example by liberating the base and neutralising with another acid or by double interaction with a suitable salt of another acid, for example of quaternary iodides with silver chloride suspensions or with ion exchangers.

Mixtures of tertiary stereoisomeric bases, for example crude reduction products or high vacuum distillates thereof can also be converted first into quaternary ammonium compounds, e.g. in mixtures of metho-iodides, these are purified by partition chromatography and/or recrystallisation and the quaternary ammonium salts obtained or other quaternary salts obtained from such, for example chlorides, e.g. by double interaction, are again converted by thermic decomposition into mixtures of stereoisomeric tertiary bases. As has already been mentioned above, in this way the stereoisomers are not separated to any considerable extent but impurities are removed which can adversely influence the identification of the fractions in the chromatogram of the tertiary bases by the infra-red spectra. Such previously purified mixtures of tertiary stereoisomeric bases can thus be more easily separated into sterical chromatogram fractions of considerable uniformity which are excellently suitable for the production of crystallised salts of the racemic quaternary bases.

Racemates of muscarine bases, of their stereoisomers and homologues can be separated into the optically active forms for example by fractional crystallisation from low molecular alkanols or alkanones, for example from isopropanol, of their salts formed with optically active di-p-toluyl tartaric acids (bis-p-toluic acid esters of d- and l-tartaric acid). In the case of the racemic muscarine base it has surprisingly been found that the dextro rotatory form corresponding to the natural muscarine forms a difficultly soluble salt with dextro-rotatory di-p-toluyl-L-tartaric acid, whilst in general dextro-rotatory bases form difficultly soluble salts with levo-rotatory acids and conversely levo-rotatory bases form difficultly soluble salts with dextro-rotatory acids such as, for example was determined by A. Stoll and A. Hofmann, Helv. Chim. Acta, 26, 922 (1943), in the separation of racemic lysergic acid hydrazide with optically active di-p-toluyl tartaric acids.

Muscarine, named from the large red toadstool, *Amanita muscaria* (fly agaric), which stimulates the parasympathetic nerve terminations is the representative of neurophysiologically active substances which has been known the longest and has been the most subjected to pharmacological tests. The process according to the present invention enables not only the production of this interesting substance in racemic or optically active form in such amounts for the broader use thereof in experimental pharmacology, as well as the therapeutical use thereof, for example for the treatment of postoperative intestinal tract immotility and urinary bladder atonia, but also the production of isomers and homologues having modified activity which is also of therapeutical interest. The 2-substituted 3-oxo-5-dialkylaminomethyl-2,3-dihydrofuranes of the general Formula IV obtained here as intermediate products are also suitable as intermediate products for the production of other pharmacologically active compounds.

The following examples further illustrate the sequence of the reactions according to the present invention. The temperatures are in degrees centigrade.

*Example 1*

(a) 49.4 g. of 2-methyl-5-formyl-furane-3-carboxylic acid ethyl ester are dissolved by slightly heating in 44.5 g. of formic acid 85% and the solution obtained is added dropwise within one hour to a mixture of 47.5 g. of pure dimethyl formamide and 14.5 g. of formic acid 85% which is heated to 155°. On completion of the addition, the reaction mixture is kept for 5 hours at 170°, whereupon it is cooled and the same volume of water is added. The neutral products are removed by several extractions with benzene. The aqueous phase is then cooled with ice and, after covering with a layer of ether, made strongly alkaline. The ether extraction is repeated twice, each time with fresh solvent. The combined extracts are dried over magnesium sulphate, filtered and concentrated and the 2-methyl-5-dimethylaminomethyl-furane-3-carboxylic acid ethyl ester is isolated by distillation in the vacuum. The compound boils at 122–135° under 10 mm. pressure. It is colourless but quickly turns yellow in the air.

(b) 45 g. of anhydrous hydrazine hydrate and 30 ccm. of abs. ethanol are added to 94 g. of the above ester and the whole is boiled under reflux for 70 hours. The reaction mixture is then distilled, at first under about 12 mm. pressure and finally in the high vacuum. The 2-methyl-5-dimethylaminomethyl-furane-3-carboxylic acid hydrazide passes over at 155–165° under 0.05 mm. pressure and it solidifies after distillation. It can be crystallised by dissolving in hot ether (under pressure) and adding hexane to the solution. After further recrystallisation from toluene, fine needles which melt at 79–80° are obtained.

(c) 63.2 g. of the distilled hydrazide obtained according to (b) are dissolved in 325 ccm. of 2 N-hydrochloric acid and the solution is placed in a three-neck flask fitted with a stirrer, dropping funnel and a reflux condenser. After covering with 200 ccm. of ether, 23 g. of sodium nitrite dissolved in 90 ccm. of water are added dropwise within 30 minutes while cooling with ice. The mixture is stirred for another 30 minutes at 0° and then 200 ccm. of 2 N-caustic soda lye are added slowly while stirring. The ethereal layer is removed and the alkaline solution is extracted twice with 250 ccm. of ether each time. The ethereal solutions of 2-methyl-5-dimethylaminomethyl-furane-3-carboxylic acid azide obtained are washed with a little saturated sodium chloride solution and dried over magnesium sulphate while cooling well. After filtering, the ether is carefully evaporated off in the vacuum. The oily azide which remains is dissolved in 50 ccm. of abs. benzene and the solution is again evaporated in the vacuum to remove traces of water. The residue is then dissolved in 100 ccm. of anhydrous benzyl alcohol and the solution is added dropwise within 30 minutes while stirring to 200 ccm. of anhydrous benzyl alcohol which has been heated to 100° whereupon vigorous nitrogen development occurs. The reaction mixture is then stirred for another hour at 100°. The excess benzyl alcohol is then removed in the vacuum at 0.1 mm. pressure. The remaining benzyl urethane (2-methyl-5-dimethylaminomethyl-furyl-(3)-carbamic acid benzyl ester) is a very viscous, brownish oil. It can be distilled in a bulb tube; it boils at 160–165° (temperature of the air bath) under 0.03 mm. pressure while partially decomposing. To further process however, the crude benzyl urethane is advantageously not distilled but dissolved in cold 2 N-hydrochloric acid, the neutral portions are removed from the solution by shaking several times with ether, the aqueous phase is then made alkaline in the cold and the benzyl urethane which separates is taken up in ether. The ethereal solution is washed with water and saturated sodium chloride solution, dried with sodium sulphate and, finally, concentrated in the vacuum. The benzyl urethane so purified solidifies after some time at 0° in crystalline form.

If, for the decomposition of the azide, abs. ethanol is used instead of benzyl alcohol, then the corresponding ethyl urethane (B.P.$_{0.03}$ 95–100°) is obtained in an analogous manner.

(d) 6.0 g. of crystallised N-[2-methyl-5-(dimethylaminomethyl)-furyl-(3)]-carbamic acid benzyl ester are dissolved in 90 ccm. of 2 N-hydrochloric acid and the solution is heated on a boiling water bath for 2½ hours. The $CO_2$ development, which at the beginning is vigorous, is completed after this time. The acid solution is then cooled in ice and the benzyl alcohol formed is removed by ether extraction. The acid solution is then again cooled to 0°, covered with ether and the pH is adjusted to 8.7–8.8 by the dropwise addition of ice cold 40% potassium hydroxide solution while stirring well. After removing the ethereal phase, the aqueous phase is extracted twice with fresh ether. The pH value is then increased gradually by the addition of potassium hydroxide solution in three steps until pH 10 is attained, ether extraction being performed after each step with fresh ether. The six ether extracts are combined, washed with ice cold saturated sodium chloride solution, dried quickly over magnesium sulphate and, after filtering, considerably concentrated. The solvent is completely removed in the vacuum whereupon the 2-methyl-3-oxo-5-dimethylamino-methyl-2.3-dihydrofurane remains as a yellow-brown, thinly liquid oil. It gradually becomes dark coloured on increasing its viscosity. It can be purified by distillation; in a bulb tube it boils at 55° air bath temperature under 0.05 mm. pressure. The basic keto compound so purified is a pale yellow oil. Plenty of iodoform is quickly obtained from the basic keto compound with sodium hydroxide alkaline iodine solution. The solution according to Fehling is strongly reduced particularly on heating. The infra-red spectrum, taken up in $CCl_4$, shows a larger number of strong absorption bands between 3 and 12. Bands of 1712 cm.$^{-1}$ (unsaturated 5 ring ketone) and 1604 cm.$^{-1}$ (5-ring enol ether) are particularly prominent.

(e) 2 g. of potassium borhydride in 10 ccm. of methanol and 5 ccm. of triethylamine are stirred while cooling with ice, and the solution of 5 g. of the crude basic keto compound in 10 ccm. of methanol is added dropwise slowly. On completion of the addition 20 ccm. of water are added to the reduction mixture and the ice bath is removed. The solution is then slowly warmed while stirring continually whereupon strong development of gas occurs. The reaction mixture is finally boiled for 15 minutes under reflux, 1.0 ccm. of 40% potassium lye is added and the whole is boiled for another 15 minutes. After cooling with ice, the reaction mixture is diluted with more water and extracted three times with chloroform. The combined chloroform extracts are washed with saturated sodium chloride solution and dried over magnesium sulphate. After filtering and evaporating the chloroform extracts, the oil which remains is distilled. In a bulb tube, the main amount of 2-methyl-3-hydroxy-5-dimethyl-aminomethyl-tetrahydrofurane passes over at 60–80° under 0.05 mm. pressure. It is in the form of a thick colourless oil.

The reduction can also be performed in other solvents such as water or methanol alone instead of mixed with or without the addition of water soluble organic tertiary bases.

(f) 2.2 g. of tetrahydrofurane derivative are dissolved in 3 ccm. of ether and 2 ccm. of isopropanol and 1.0 ccm. of methyl iodide is added. The 2-methyl-3-hydroxy-5-(N.N.N-trimethyl-aminomethyl)-tetrahydrofurane iodide forms in an exothermic reaction and separates as a heavy oil. To purify, it is converted into the chloride by means of an aqueous silver chloride suspension and this is chromatographed through a column prepared with 600 g. of cellulose using a mixture of 150 parts by volume of sec. butanol, 50 parts by volume of abs. ethanol, 50 parts of water and 10 parts by volume of glacial acetic acid as solvent. By crystallising those fractions the Rf value of which in a paper chromatogram is similar to that of muscarine from isopropanol/acetone, a very hygroscopic mixture of stereoisomers is obtained which melts at 136–150°. (Rf values of natural muscarine in different mixtures of solvents are given in Helv. Chim. Acta, 39, 416 (1956). In the solvent mixture given above the Rf value, using ascending chromatography, is 0.37–0.40.) On recrystallising several times, a main crystal fraction which melts at 148–152° (from isopropanol/acetone) is obtained. The quaternary iodide is obtained from the chloride, for example by percolation through an anion exchanger, evaporation of the solution and drying in the vacuum and crystallisation from isopropanol/ether. M.P. 117–118°.

Tetrachloroaurate M.P. 79–83° (fine platelets recrystallised from water).

Tetraphenyl borate, 174.5–175.5° (recrystallised from a great deal of methanol or from acetone/petroleum ether).

In a manner analogous to that described in the above example, 2-phenyl-3-oxo-5-dimethylaminomethyl-2.3-dihydrofurane and 2-phenyl-3-hydroxy-5-dimethylaminomethyl-tetrahydrofurane obtained therefrom are obtained on using 2-phenyl-5-formyl-furane-3-carboxylic acid ethyl ester (M.P. 72–74° from cyclohexane) by way of 2-phenyl-5-dimethylaminomethyl-furane-3-carboxylic acid ethyl ester (B.P.$_{12}$=200–203°) and N-[2-phenyl-5-dimethylaminomethyl-furyl-(3)]-carbamic acid benzyl ester (M.P. 122–125° from carbon tetrachloride/cyclohexane 1:1).

Starting from 2-benzyl-5-formyl-furane-3-carboxylic acid ethyl ester, 2-benzyl-3-oxo-5-dimethylaminomethyl-2.3 - dihydrofurane and 2-benzyl-3-hydroxy-5-dimethylaminomethyl-tetrahydrofurane are obtained, Starting from 2-cyclopropyl-5-formyl-furane-3-carboxylic acid ethyl ester, 2-cyclopropyl-3-oxo-5-dimethylaminomethyl-2.3-dihydrofurane and 2-cyclopropyl-3-hydroxy-5-dimethylaminomethyl-tetrahydrofurane are obtained, and Starting from 2-isobutyl-5-formyl-furane-3-carboxylic acid ethyl ester, 2-isobutyl-3-oxo-5-dimethylaminomethyl-2.3-dihydro-furane and 2-isobutyl-3-hydroxy-5-dimethylaminomethyl-tetrahydro-furane are obtained.

*Example 2*

10 g. of the 2-methyl-5-dimethylaminomethyl-furane-3-carboxylic acid azide obtained according to Examples 1(a)–(c) are boiled under reflux for 2 hours in 100 ccm. of boiling benzene. After this time the nitrogen development, which has been slow and even, is practically completed. The benzene solution is then evaporated in the vacuum at 40° in a nitrogen atmosphere. The isocyanate which remains is then added dropwise to 10 ccm. of sulphuric acid heated on a steam bath whereupon after each drop carbon dioxide is split off. The reaction mixture is then heated for 30 minutes on a steam bath, made alkaline with sodium carbonate in a nitrogen atmosphere, filtered, the residue is washed with methylene chloride and extracted four times with methylene chloride. The combined methylene chloride solutions are concentrated. The residue is crude 2-methyl-3-oxo-5-dimethylaminomethyl-2.3-dihydrofurane which can be further worked up if desired after distillation in the high vacuum, according to Example 1(e) or according to Example 4 or 5.

*Example 3*

The unsaturated basic keto compound obtained in Examples 1(e) and 2, can also be obtained by dissolving 300 g. of crude 2-methyl-5-dimethylaminomethyl-furane-3-carboxylic acid azide in 1500 ccm. of 4 N-hydrochloric acid and heating the solution on a steam bath for 7 hours in a nitrogen atmosphere. The acid solution is then neutralised with 30% caustic soda lye at 0–5° until phenolphthalein paper turns slightly red, 1500 ccm. of ice cold saturated sodium carbonate solution are added and the whole is repeatedly extracted with methylene chloride. The combined extracts are washed in water, dried with sodium sulphate, concentrated in the vacuum and the oily residue is distilled in the high vacuum. After distilling twice, 2-methyl-3-oxo-5-dimethylaminomethyl-2.3-dihydrofurane is obtained as a pale yellow oil. M.P. 46–49° under 0.001 mm. pressure.

*Example 4*

According to a slightly modified method of performing the reduction with potassium borhydride, 48 g. of 2-methyl-3-oxo-5-dimethylaminomethyl-2.3-dihydrofurane are dissolved in 100 ccm. of methanol and the solution is added dropwise while stirring at 0–5° within one hour in a nitrogen atmosphere to a suspension of 37.5 g. of potassium borhydride in 200 ccm. of methanol and 100 ccm. of triethylamine. The reaction mixture is stirred for another 15 minutes in an ice bath, 250 ccm. of cold water are added dropwise, after removing the ice bath, the solution obtained is brought to the boil within one hour and then boiled for 15 minutes. The reaction solution is then cooled, 250 ccm. of water are added and the whole is extracted six times with methylene chloride. The combined extracts are dried over sodium sulphate, greatly concentrated in the vacuum and the residue is distilled in the high vacuum. The main amount of the crude substance passes over between 52–83° under 0.01–0.03 mm. pressure. This fraction is again distilled using a glass column 0.8 cm. wide and 40 cm. high lined with a wire spiral, whereupon a first main fraction boiling at 46–51° under 0.05–0.03 mm. pressure, an intermediate fraction boiling at 51–60° under 0.03–0.02 mm. pressure and a second main fraction boiling at 60—about 83° under 0.02–0.01 mm. pressure are obtained. In the first main fraction the rac. epi-normuscarine and the rac. allo-normuscarine are greatly enriched. The rac. normuscarine and rac. epiallo-normuscarine are also in the second main fraction. Some fractionation can also be done already in the first distillation in the high vacuum. On further separating the fractions and again distilling them, some stereoisomers, in particular rac. epi-normuscarine and rac. allo-normuscarine can also be enriched.

*Example 5*

(a) 3.82 g. of a mixture of bases obtained analogously to Example 4 by reduction of 2-methyl-3-keto-5-dimethylaminomethyl-2.3-dihydrofurane with potassium borhydride (fraction of B.P. 42–45° at 0.003 mm. pressure) are dissolved in 5 cc. of benzene and adsorbed on a column prepared in benzene from 230 g. of aluminium oxide of activity II–III (Al$_2$O$_3$-Woelm, stage of activity I, deactivated by shaking with 5% by weight of water). Benzene elutes from the column rac. epi-normuscarine (identified by infra-red spectra), which can be purified by distillation in high vacuum. (Bulb tube; bath temperature 90–100° at 0.002 mm. pressure.) The methiodide (rac. epi-muscarine iodide) prepared analogously to Example 1 melts at 130° (from acetone). The very hygroscopic methochloride (rac. epi-muscarine chloride), crystallised from isopropanol/ether, melts at 139.5–140.5°. Rac. epi-muscarine tetraphenyl borate; M.P. 180–181° (from acetone/ethanol); rac. epi-muscarine tetrachloroaurate: M.P. 106–107° (from water).

Benzene containing increasing additions of ether, as well as abs. ether alone, first elute impure rac. allo-muscarine together with rac. epi-normuscarine, then isomer-free, almost pure rac. allo-normuscarine. The latter is further purified by repeated similar chromatography on 100 times the amount of Al$_2$O$_3$, in which case it is eluted with benzene. The substance is distilled in the bulb tube at bath temperature of 90–100° and 0.002 mm. pressure. The rac. allo-normuscarine is a colourless oil; its hydrochloride crystallises from isopropanol/ether in long thin prisms which melt at 164–166°. The tetraphenyl borate can be obtained from the hydrochloride by precipitating with sodium tetraphenyl borate. From acetone/water or acetone/ether it crystallises into rhombi which melt at 151.5–153°. The quaternary salts prepared as in Example 1 show the following constants:

Methiodide (rac. allo-muscarine iodide, M.P. 129–130° crystallised from acetone; 131–132° from isopropanol/ether);

Methochloride (rac. allo-muscarine chloride, M.P. 153–154° from isopropanol/ether, very hygroscopic);

Rac. allo-muscarine-tetraphenyl borate, M.P. 175–176° from ethanol;

Rac. allo-muscarine-tetrachloroaurate, M.P. 77.5–79° from water;

Rac. allo-muscarine Reinecke salt, M.P. 172.5–173°, fine long prisms from acetone/water.

(b) 3.35 g. of a mixture of bases which is the fraction of B.P. 66–72° under 0.004 mm. pressure from a reduction of 2-methyl-3-oxo-5-dimethylaminomethyl-2.3-dihydrofurane with potassium borhydride analogous to Example 4, are adsorbed in 10 ccm. of benzene on a column prepared in benzene from 315 g. Al$_2$O$_3$ (deactivated by shaking with 10% of water). On eluting with benzene and with benzene containing 10% by volume of ether, a non-uniform material is obtained. 1.17 g. of pure rac. normuscarine are eluted with abs. ether and coincide absolutely in infra-red spectrum with the normuscarine obtained from natural muscarine.

After distillation in a bulb tube (bath temperature 100–110°, pressure 0.001 mm.) the normuscarine is a colourless oil. On dissolving a part of the distillate in acetone and adding excess methyl iodide, crystallised rac. muscarine iodide is obtained which after recrystallising from acetone or a mixture of isopropanol/ether, melts at 108–109°. On shaking an alcoholic solution of this iodide with freshly precipitated silver chloride, the very hygroscopic rac. muscarine chloride is obtained which melts, on recrystallisation from isopropanol/ether, at 147–148°. The infra-red spectra of the rac. muscarine iodide and rac. muscarine chloride so obtained are identical with the infra-red spectra of natural muscarine iodide and muscarine chloride.

On adding sodium tetraphenyl borate to an aqueous solution on rac. muscarine iodide or chloride, the rac. muscarine tetraphenyl borate precipitates in crystal form. On recrystallising from acetone/ethanol, it melts at 174–175°. On adding excess gold chloride solution in diluted hydrochloric acid to an aqueous solution of the rac. muscarine chloride, rac. muscarine tetrachloroaurate is obtained which crystallises from water in fine platelets or in heavy thick prisms which melt at 93–94°.

On continuing the elution of the chromatogram named at the beginning of paragraph (b) with abs. ether, in the following fractions mixtures of rac. normuscarine and rac. epiallo-normuscarine are obtained and finally rac. epiallo-normuscarine free of isomers is obtained in the further fractions. On distilling the corresponding fractions in a bulb tube, this base passes over at 100–110° bath temperature under 0.002 mm. pressure and it condenses as a colourless oil. It is converted into quaternary derivatives in a manner analogous to that given for normuscarine, which derivatives have the following melting points:

| | |
|---|---|
| Rac. epiallo-muscarine iodide | 159–160° |
| Rac. epiallo-muscarine chloride | 159–161° |
| Rac. epiallo-muscarine tetraphenyl borate | 191–192° |
| Rac. epiallo-muscarine tetrachloroaurate | 97–99° |

The stereoisomers present in all or in chosen fractions of the chromatograms can be identified analogously to Examples 5(a) and (b), for example with the aid of infrared spectra, attached as drawings, of the four racemic stereoisomers and of normuscarine from natural muscarine.

*Example 6*

(a) 1.185 g. of crystallised rac. muscarine iodide, produced by quaternising a rac. normuscarine isolated according to Example 5 with methyl iodide, is shaken for 2 hours with silver oxide freshly precipitated from 4.0 g. of silver nitrate in 30 ccm. of ethanol. The silver iodide and oxide are then filtered off and the ethanol is evaporated off in the vacuum. The oil which remains is dissolved in 25 ccm. of abs. isopropanol and a hot solution of 1.520 g. (+)-di-p-toluyl-L-tartaric acid in 16 ccm. of abs. isopropanol is added. After cooling the solution to 30–40°, the acid salt begins to crystallise. The whole is left to stand for another hour at room temperature and the salt is then filtered off under suction. It is recrystallised three times from 50 times the amount of abs. isopropanol each time, whereupon the pure salt of (+)-muscarine base which melts at 151–152° is obtained.

480 mg. of the above acid salt are dissolved in 20 ccm. of 50% ethanol, the solution is filtered through a column composed of 50 cc. Amberlite IRA 400 (OH⁻) and then water is filtered through the column until the filtrate no longer reacts to Dragendorff reactant. The whole filtrate is then acidified with 2 ccm. of 2 N-hydrochloric acid and concentrated at 30° in a water jet vacuum in a nitrogen atmosphere. After recrystallising from isopropanol/acetone the (+)-muscarine chloride so obtained melts at 178–179°. $[\alpha]_D^{25} = +8.1°$ (c.=2.9 in ethanol). The biological action of this substance on the blood pressure of the cat is both qualitatively and quantitatively completely identical with that of natural (+)-muscarine chloride.

After concentrating the mother lye from the salt formation of di-p-toluyl-L-bitartrate, a crystalline residue is obtained which is converted as described above into the chloride of non-uniform (−)-muscarine. On recrystallising several times from isopropanol/acetone, crystals of pure (−)-muscarine chloride are obtained.

(b) Conversely, also the salt of (−)-muscarine base with (−)-di-p-toluyl-D-tartaric acid can be obtained as the first product of the salt formation by converting for example 1.067 g. of crystallised rac. muscarine iodide into the free base as described above with the silver oxide precipitated from 3.0 g. of silver nitrate, dissolving the free base in 22 ccm. of abs. isopropanol and adding a hot solution of 1.520 g. of (−)-di-p-toluyl-D-tartaric acid in 15 ccm. of abs. isopropanol. After cooling and allowing to stand for 1 hour at room temperature, the salt which crystallises out is filtered off under suction and recrystallised three times with 60-times the amount of abs. isopropanol each time. The pure salt of (−)-muscarine base so obtained also melts at 151–152°.

The (−)-muscarine chlorine is obtained therefrom as described above for the dextro-rotatory form, which melts at 179–180° after recrystallising twice from isopropanol/acetone. $[\alpha]_D^{24} = -8.4$ (c.=2.87 in ethanol). This substance has less than 5% of the action of the (+)-muscarine chloride on the blood pressure of the cat.

The residue of the mother lye from the salt formation can also be converted into a crude chloride in the manner described under (a) above, from which after recrystallising twice from isopropanol/acetone, crystals of pure (+)-muscarine chloride (M.P. 177–179°) are obtained.

*Example 7*

The reduction of 2-methyl-3-oxo-5-dimethylaminomethyl-2.3-dihydrofurane by means of sodium borhydride can be performed for example as follows:

5 g. of sodium borhydride are added to an ice cold mixture of 25 ccm. of methanol and 12.5 ccm. of triethylamine and the whole is stirred for 15 minutes. Then a solution of 11.75 g. of the named unsaturated ketone in 25 ccm. of methanol is added dropwise within 30 minutes, also while stirring and cooling with ice, whereupon the temperature rises from 2° to about 8°. Cold water is then added dropwise whereupon there is a strong development of gas. The ice bath is then removed and the reaction solution is slowly warmed so that boiling temperature is reached after one hour's time. The solution is then refluxed for 15 minutes, 2 ccm. of concentrated caustic soda lye are added and the whole is again boiled for 15 minutes after which it is cooled and diluted with 50 ccm. of water. The reaction product is extracted by shaking out five times with methylene chloride. The combined extracts are dried over sodium sulphate and concentrated in the vacuum. The crude 2-methyl-3-hydroxy-5-dimethylaminomethyl-tetrahydrofurane which remains is distilled in the high vacuum, two main fractions of B.P.$_{0.004}$ 45–50° and B.P.$_{0.004}$ 63–70° being obtained. Each is again distilled in the vacuum. The main fractions obtained can be separated into uniform rac. stereoisomers by adsorption chromatography analogous to Example 5(a) or 5(b).

*Example 8*

(a) A mixture of 77 g. of 2-n-propyl-5-tetrahydroxy-butyl-furane-3-carboxylic acid ethyl ester (obtained in the known manner by condensing glucose with butyroyl acetic acid ethyl ester by means of zinc chloride, M.P. 147–148° from ethyl acetate), 420 ccm. of glacial acetic acid, 420 ccm. of water and 500 ccm. of benzene is heated to 50–55° and, while keeping the temperature constant, 641 g. of minium ($Pb_3O_4$) are slowly added while stirring well. When the oxidation is complete, the reaction mixture is cooled with ice and is filtered with a filtration additive on the filter. The residue is washed with plenty of benzene, the benzene phase is removed and the aqueous phase is thoroughly extracted with benzene. The combined benzene solutions are repeatedly washed with saturated ammonium sulphate solution, dried and concentrated. The yellowish oil which remains is distilled in the vacuum and 2-n-propyl-5-formyl-furane-3-carboxylic acid ethyl ester passes over under 9 mm. pressure at 130–135°.

(b) 70 g. of the ester mentioned above and 100 g. of 33% aqueous dimethylamine solution in 200 ccm. ethanol are hydrogenated at room temperature at an initial pressure of 100 atm. in the presence of 4 g. of palladium catalyst (10% palladium on charcoal). On completion of the hydrogen absorption, the catalyst is filtered off and the filtrate is concentrated in the vacuum. The concentrated solution is acidified with hydrochloric acid and extracted with benzene to remove the neutral parts. It is then made alkaline with sodium carbonate and extracted with ether. The ether extract is dried over magnesium sulphate, filtered, concentrated and the 2-n-propyl-5-dimethylaminomethyl-furane-3-carboxylic acid ethyl ester which remains is rectified in the vacuum. It passes over between 125–130° under 9 mm. pressure; its picrate melts at 110–112° (from water).

Instead of by reductive amination, these basic esters can also be produced according to Leuckart analogously to Example 1(a).

(c) 50 g. of the above basic ester, 25 g. of anhydrous hydrazine hydrate and 20 ccm. of abs. ethanol are boiled under reflux for about 70 hours. The reaction mixture is then distilled, at first under about 12 mm. pressure and then in the high vacuum; the 2-n-propyl-5-dimethylamino methyl-furane-3-carboxylic acid hydrazide passes over at 125–130° under 0.001 mm. pressure. From toluene it crystallises into fine needles which melt at 82–83°. It is very hygroscopic.

(d) 32.2 g. of the crude hydrazide are dissolved in 80 ccm. of 4 N-hydrochloric acid, and the solution is covered with 100 ccm. of ether. An aqueous solution of 12 g. of sodium nitrite is added dropwise while stirring at 0–5° until a positive reaction on potassium iodide-starch paper remains for 30 minutes. 80 ccm. of 30% ice cold caustic soda lye are then added while stirring, the phases are separated and the aqueous phase is extracted several times with ether. The combined ether solutions are washed several times with saturated sodium chloride solution, dried over magnesium sulphate and then concentrated in the vacuum at a bath temperature of 20°. The crude 2-n-propyl-5-dimethylaminomethyl-furane-3-carboxylic acid azide remains as a yellow oil.

(e) 23 g. of crude azide are dissolved in 115 ccm. of 4 N-hydrochloric acid and the solution is heated on a water bath for 6 hours in a nitrogen atmosphere. The acid solution is then cooled to 0–5°, neutralised with 30% caustic soda lye and 80 ccm. of saturated sodium carbonate solution are added. The whole is extracted several times with methylene chloride, the extracts are washed with water, dried with sodium sulphate and, after concentrating in the vacuum, the residue is distilled in the high vacuum. 2-n-propyl-3-oxo-5-dimethylaminomethyl-2.3-dihydro-furane boils between 50–60° under 0.01 mm. pressure (bulb tube in air bath) and is a pale yellow oil which is very sensitive to oxidation.

(f) A mixture of 3 g. of the above basic keto compound in 6 ccm. of methanol is added dropwise while stirring to an ice cold mixture of 1 g. of potassium borhydride, 5 ccm. of methanol and 2.5 ccm. of triethylamine. 10 ccm. of water are then added to the reduction mixture, the ice bath is removed, the temperature is slowly raised while continually stirring until boiling temperature is reached and then the whole is refluxed for 15 minutes. 0.5 ccm. of 40% potash lye are then added to the reduction solution and it is again boiled for 15 minutes. It is then cooled with ice, diluted with water and extracted three times with chloroform. The combined chloroform extracts are washed with saturated sodium chloride solution and dried over magnesium sulphate. After filtering and concentrating, the oil which remains is distilled in the high vacuum.

The main fraction of this distillation is again distilled; a stereoisomeric mixture of 2-n-propyl-3-hydroxy-5-dimethylaminomethyl-tetrahydrofurane is obtained under 0.01 mm. pressure; boiling range 40–75°.

(g) The twice distilled mixture of stereoisomers mentioned above can be converted analogously to Example 1(f) into the methiodide (2-n-propyl-3-hydroxy-5-trimethylamoniomethyl-tetrahydrofurane iodide) and this can be converted into the methochloride. Both are lacquer-like, non-crystallising stereoisomeric mixtures. On subjecting the methochloride to partition chromatography on a cellulose column analogous to Example 1(f), three crystallised tetraphenyl borates of the quaternary bases can be obtained from the individual fractions. The three tetraphenyl borates have the same composition but the melting points given below:

131–134°
135.5–137.5°
and
142.5–144.5°

What we claim is:

1. Process for the production of amines of the tetrahydrofurane series of the formula

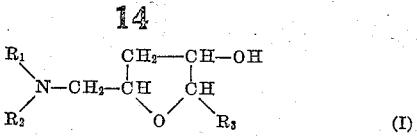

wherein each of $R_1$ and $R_2$ represents a lower alkyl radical and $R_3$ represents a member selected from the group consisting of lower alkyl, cyclopropyl, phenyl and benzyl, comprising reacting in formic acid, a 2-substituted 5-formyl-furane-3-carboxylic acid alkyl ester of the formula

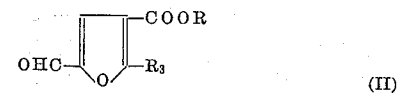

wherein R represents a lower alkyl radical, with a lower dialkyl formamide of the formula

to form a 2-substituted 5-dialkylaminomethyl-furane-3-carboxylic acid alkyl ester, converting the latter by consecutive treatment with hydrazine and then nitrous acid into the corresponding acid azide and heating the latter with an aqueous mineral acid and reducing the resultant 2 - substituted 3 - oxo-5-dialkylaminomethyl-2.3-dihydro-furane of the formula

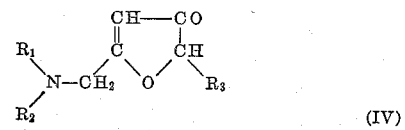

by treating it with an alkali metal borhydride to form the corresponding 2 - substituted 3-hydroxy-5-dialkyl-aminomethyl-tetrahydrofurane of the Formula I, and separating into fractions of substantially pure stereoisomers by adsorption chromatography.

2. Process according to claim 1 wherein the acid azide is converted into the 2-substituted 3-oxo-5-dialkyl-aminomethyl-2.3-dihydrofurane of Formula IV by reacting said acid azide with a hydroxyl compound selected from the group consisting of a lower alkanol and a lower phenyl alkanol and heating the 2-substituted 5-dialkyl-aminomethyl-furyl-(3)-carbamic acid ester obtained with an aqueous mineral acid.

3. Process according to claim 1 wherein the acid azide is converted into the 2-substituted 3-oxo-5-dialkylamino-methyl-2.3-dihydrofurane of Formula IV by reacting said acid azide with lower alkanoic acid and heating the 2-substituted 3-acylamino-5-dialkylaminomethylfurane obtained with an aqueous mineral acid.

4. Process according to claim 1 wherein the acid azide is converted into the 2-substituted 3-oxo-5-dialkylamino-methyl-2.3-dihydrofurane of Formula IV by heating in an inert organic solvent and then heating the 3-isocyano-5-dialkylaminomethyl-furane obtained with an aqueous mineral acid.

5. Process according to claim 1 which comprises reducing the 2-substituted 3-oxo-5-dialkylaminomethyl-2.3-dihydro-furane of the Formula IV by treating it with an alkali metal borhydride in the presence of triethylamine to form the corresponding 2-substituted 3-hydroxy-5-dialkylaminomethyl-tetrahydrofurane of Formula I.

6. Process according to claim 1 comprising adsorbing the stereoisomeric mixture of 2-methyl-3-hydroxy-5-dimethylaminomethyltetrahydrofurane on an aluminium oxide column from a non-polar to slightly polar solvent and eluting in fractions with such a solvent.

7. A basic compound of the formula:

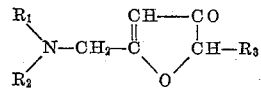

wherein each of $R_1$ and $R_2$ is lower alkyl, and $R_3$ is a member selected from the group consisting of lower alkyl, cyclopropyl, phenyl and benzyl.

8. 2-methyl-3-oxo-5-dimethylaminomethyl-2.3-dihydrofurane.

9. 2-propyl-3-oxo-5-dimethylaminomethyl-2.3-dihydrofurane.

References Cited in the file of this patent

FOREIGN PATENTS

| | | |
|---|---|---|
| 768,603 | Great Britain | Feb. 20, 1957 |
| 923,893 | France | Feb. 24, 1947 |

OTHER REFERENCES

Henecka: Chemical Abstracts, vol. 31, pages 5792–3 (1937).

Quarendon: Manufacturing Chemist and Manufacturing Perfumers, vol. 14 (1943), No. 8, pages 251–4.

Karrer: Organic Chemistry (second English edition), 1946, pages 98–101, 127.

Karrer: Organic Chemistry (second English edition), 1946 (Elsevier Pub. Co.), pages 91–94.

Dunlop: The Furans, A.C.S., Monograph No. 119 (1953) (Reinhold Publ. Co.), pages 247, 541–4.

Schmidt: Organic Chemistry (seventh edition, 1955), pages 29, 34, 90–5.

Naranov et al.: Chem. Absts., vol. 50 (1957), column 2574.

Kogl et al.: Experientia, vol. 13 (1957), pages 137–8.

Kogl et al.: Experientia, vol 13 (1957), pages 138–9.

Kogl et al.: Ann. Chem. Justus Liebigs, volume 608 (1957), pages 81–7.

Kogl et al.: Rec. trav. chim., vol. 76, pp. 109–127 (1957).